March 9, 1971     W. M. SHARP, JR     3,568,337

TYPIST PACESETTING DEVICE

Filed April 17, 1968     5 Sheets-Sheet 1

WALTER M. SHARP, JR.
INVENTOR

BY Gray, Mase & Dunson

ATTORNEYS

March 9, 1971  W. M. SHARP, JR  3,568,337
TYPIST PACESETTING DEVICE

Filed April 17, 1968  5 Sheets-Sheet 2

WALTER M. SHARP, JR.
INVENTOR

BY

ATTORNEYS

March 9, 1971  W. M. SHARP, JR  3,568,337
TYPIST PACESETTING DEVICE

Filed April 17, 1968  5 Sheets-Sheet 3

WALTER M. SHARP, JR
INVENTOR

BY Gray, Mase & Dunson

ATTORNEYS

INVENTOR.
WALTER M. SHARP, JR.
BY GRAY, MASE & DUNSON
ATTORNEYS

United States Patent Office 3,568,337
Patented Mar. 9, 1971

3,568,337
TYPIST PACESETTING DEVICE
Walter M. Sharp, Jr., Columbus, Ohio, assignor to The Battelle Development Corporation, Columbus, Ohio
Continuation-in-part of application Ser. No. 638,543, May 15, 1967. This application Apr. 17, 1968, Ser. No. 729,865
Int. Cl. G09b 17/04
U.S. Cl. 35—35                                    10 Claims

ABSTRACT OF THE DISCLOSURE

A pacesetting apparatus for improving typing skills including a means for affecting relative motion between a copy sheet and a masking member having an elongated opening or transparent window at a constant predetermined rate. Various type symbols are arranged on the copy sheet in lines which slant from left to right. The various symbols successively become visible through the opening or transparent window for a predetermined period of time as the masking member achieves relative motion with respect to the copy sheet.

BACKGROUND OF THE INVENTION

This application is a continuation-in-part of my copending application Ser. No. 638,543, filed May 15, 1967, and now abandoned.

This invention is concerned with devices used for teaching and improving typing skills, and more particularly with pacesetting devices which aid the typist in developing a uniform typing speed.

Various reading pacers are available which involve machine-driven, timed movement of a line guide along a printed page. These pacers are useful for improving reading skills but they are generally not acceptable for the teaching of typing skills where concentration, accuracy, and uniform speed are of great importance. Ordinary reading speeds are necessarily much faster than typing speeds and, consequently, emphasis is placed on comprehending a large number of words at one time. Thus, reading pacers successively reveal entire printed lines and encourage the user to read as much of the line as possible at one time. The typist, on the other hand, is encouraged to read only single words or short phrases at one time in order that visual stimuli be transformed into physical movement of the fingers without confusion.

Beginning typists and those who wish to improve their skills often find it difficult to make the transition from the multiple word comprehension used in general reading to the word or short phrase comprehension required for typing. The typist may be reading words considerably ahead of those which are being typed and as a consequence the fingers subconsciously respond to the wrong stimuli and mistakes are made. Also several keys of the typewriter may be depressed simultaneously resulting in jammed keys.

To eliminate this problem, it is suggested that only a limited number of words be revealed to the learning typist at any one time whereby the typist will be forced to develop the peculiar form of concentration which is required for typing. U.S. Pat. 1,488,459, Biggs et al., discloses a typist aid which reveals copy through elongated, horizontal openings sufficiently wide to expose but one line of copy and sufficiently short to expose but a limited number of the printed elements. In the Biggs device the elongated openings are stationary and, therefore, the typist's eyes do not move across or down the copy in the normal manner. Thus, the typist may develop the undesirable habit of allowing the eyes to remain in one position.

The present invention provides an improved pacesetting system wherein individual words or short phrases are successively revealed to the typist in such a manner that the typist's eyes follow a more normal and accepted pattern across and down an ordinary size copy sheet. Thus, the typist is encouraged to develop the most advantageous reading and concentration patterns much more effectively than has previously been possible. Through use of this invention the typist can achieve automatization of many words or phrases, which in turn enables the typist to maintain a fluent, rhythmic stroking pattern in sustained writings.

SUMMARY

The present invention provides a typist pacesetting device utilizing a mechanized drive means for affecting relative motion between a copy sheet on which type symbols are arranged in lines slanting from left to right and a masking member formed with an elongated opening or transparent wnidow whereby a limited number of the type symbols are successively revealed for a predetermined period of time. The typing speed can be varied by changing the angle at which the type symbols are arranged on the copy sheet or by varying the speed of the drive mechanism. The sequence or pattern of revealing symbols moves from left to right across and down the copy sheet to approximate normal procedure.

The device of this invention is extremely simple to operate and is small enough to fit on an ordinary typing desk. The construction of the device is uncomplicated and is inexpensive to manufacture. This device is also extremely stable in operation and requires little if any maintenance. It may be used by teachers, students, employed typists seeking to meet requirements for advancement, or by anyone desiring to improve their typing skills.

Another significant advantage of this invention is that the drive mechanism involved may be interchangeably used on a typewriter as a system for detecting irregularities in typing technique as disclosed in U.S. Pat. 3,285,384 granted to the same inventor. Thus, a complete and comprehensive program of typing instruction can be provided with a minimum investment in equipment.

In the drawings the same reference numerals are applied to identical parts in all embodiments and such identically numbered parts are substantially identical in structure, function, and operation. Therefore, to eliminate confusing duplication, these parts, their inter-relationship and their function will be described only in conjunction with a single embodiment, such description applying to all embodiments where these parts appear.

Figure 1:
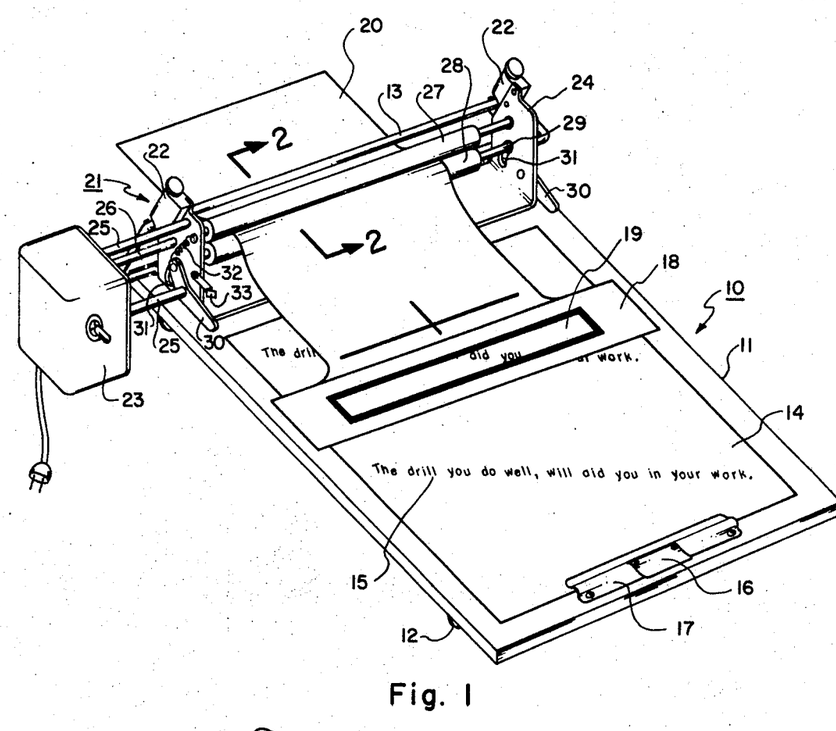
FIG. 1 is a perspective view of one embodiment of the invention.
Figure 2:
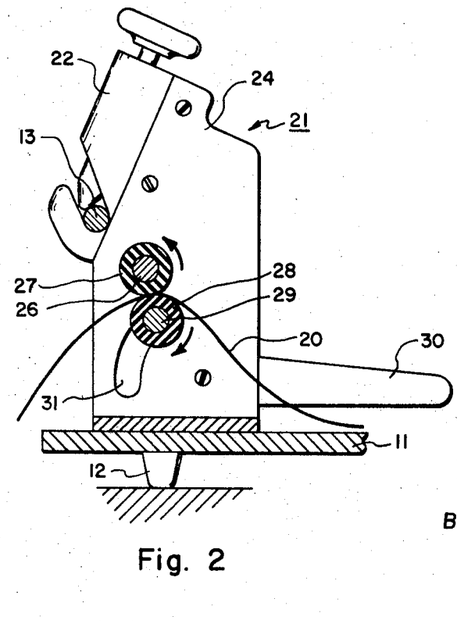
FIG. 2 is an enlarged sectional view of the drive mechanism taken along line 2—2 in FIG. 1.

One embodiment of the invention, illustrated in FIGS. 1 and 2, provides a typist pacesetting device which includes a support element 10 and a drive mechanism 21. The support element includes a copy support surface 11 which is generally rectangular in form and is constructed of suitably rigid material such as sheet steel, aluminum, or heavy plastic. The copy support surface is provided with rubber feet 12 that prevent it from sliding or moving when subjected to vibrations caused by the typewriter.

Copy support surface 11 is also provided with a drive mechanism support 13. In this particular embodiment of the invention, drive mechanism support 13 is constructed of a small diameter rigid rod which is formed to resemble the bail of a typewriter. The ends of the drive mechanism support 13 are fixedly attached to the upper end of copy support surface 11 such that the intermediate portion of that support extends laterally across and parallel to the upper end of surface 11. Other forms of the drive mechanism support are possible without departing from the scope of this invention.

A copy sheet 14, on which is printed a drill or test to be copied by the typist, is placed on surface 11. This sheet is made of a thin, flexible lightweight material such as paper or plastic. The drill or test printed thereon consists of type symbols 15 arranged in one or more angular lines across the face of the sheet. These angular lines slant at an inclined angle from left to right with each successive symbol in a particular line being positioned a predetermined distance lower on the copy sheet than the previous symbol appearing in that line. This distance should be the same for all symbols in any one angular line and is determined by the desired typing speed. Thus, typing speed may be varied by employing copy sheets with symbols arranged at a greater or lesser angle of inclination for slower or faster speeds respectively.

Copy sheet 14 is secured to support element 10 by means such as clip 16. Clip 16 is of usual construction (such as is used on standard clipboards) being composed of a resilient portion 17 which is bolted along one edge of support element 10 and a thumb lever for springing the resilient portion 17 to insert or remove copy sheets. This clip may be an integral part of support element 10 or may be separately attached. Other means such as tacks, elastic bands, an adhesive, or a raised lip are alternative means for stationarily positioning the copy sheet.

A flexible masking sheet 18 is positioned as overlying copy sheet 14 and is disposed to mask out preselected symbols on the face of the copy sheet. The masking sheet is made of a thin lightweight material such as paper or plastic. In the perferred form, masking sheet 18 is formed with an elongated opening or window 19 through which only the desired preselected symbols are revealed. All symbols in the immediate area surrounding the desired symbols are masked out making it easier for the typist to concentrate on the particular symbol or group of symbols to be copied. Masking sheet 18 is formed with a drive strip 20 which is designed to be frictionally gripped by the opposing rollers of a drive mechanism described below.

A drive mechanism 21 is secured to drive mechanism support 13 of support element 10 by spring-loaded, bolt-type clamps 22. This drive mechanism is similar to that disclosed by the present inventors in U.S. Pat. 3,285,384 for use on a typewriter. It is intended that the mechanism be interchangable between the two systems with clamps 22 being suitable for mounting the mechanism to the bail of a typewriter as well as to the support element of the present invention. Drive mechanism 21 includes a constant speed electric motor 23 which is mounted outwardly of one of the upwardly extending arms of a generally U-shaped frame 24 by means of support rods 25. The drive shaft 26 of electric motor 23 extends horizontally through the upwardly extending arms of frame 24 and is journaled therein. A hollow cylindrical drive roller 27 of a resilient material such as rubber, synthetic rubber, or a plastic having the general characteristics of rubber is secured on the portion of drive shaft 26 between the arms of frame 24.

A hollow cylindrical tension roller 28 of a material similar to that of drive roller 27 is similarly secured on an idler shaft 29. Shaft 29 is mounted parallel to drive shaft 26 within frame 24 and is journaled in the ends of release levers 30. The release levers 30 are pivotally mounted to the arms of frame 24 so that pivotal motion of levers 30 causes shaft 29 to move through an arc within the slots 31 of frame 24. Thus, tension roller 28 may be disengaged from frictional contact with drive roller 27 by raising upwardly the free ends of levers 30. Tension is maintained between drive roller 27 and tension roller 28 by springs 32 (only one of which is shown). One end of spring 32 is secured to frame 24 and the other end is secured to the journal end of lever 30.

Tension roller 28 may be held in the disengaged position by retaining lock 33 which is secured to frame 24. The retaining lock is preferably made of spring steel. To secure the roller 28 in the disengaged position, the free end of lever 30 is raised upwardly until it engages in the bend of the retaining lock 33. When it is again desired to engage the rollers, the retaining lock 33 is pressed inward which releases lever 30 and allows spring 32 to pull tension roller 28 into driving engagement with drive roller 27.

To use the foregoing embodiment of this invention the typist first selects a preprinted copy sheet 14. Type symbols 15 appear on the face of the sheet in diagonal lines slanting from left to right at an angle which corresponds to a particular typing speed—say 50 words per minute. The selected copy sheet is secured to the support element 10 by clip 16. Next, by pivoting levers 30 tension roller 28 is disengaged from drive roller 27 and locked in position by retaining lock 33. Drive strip 20 of masking sheet 18 is inserted between drive roller 27 and tension roller 28 until elongated opening or window 19 is positioned at the top of copy sheet 14. Lock 33 is then released causing drive strip 20 to be frictionally engaged between the two rollers.

When the typist is ready to begin the drill, electric motor 23 is turned on which rotates drive roller 27 in the appropriate direction to cause masking sheet 18 to move downwardly over copy sheet 14. As the masking sheet slides over the copy sheet, the typist copies symbols 15 as they are successively revealed in the window. The speed of the electric motor is constant and is preferably set so that the masking sheet travels over the copy sheet in a period of one minute. The typing speed is varied by using different copy sheets on which the angle of incline of the symbols varies according to a preselected typing speed. The typing speed may also be varied by using one copy sheet and varying the speed of the electric drive motor.

Figure 3:
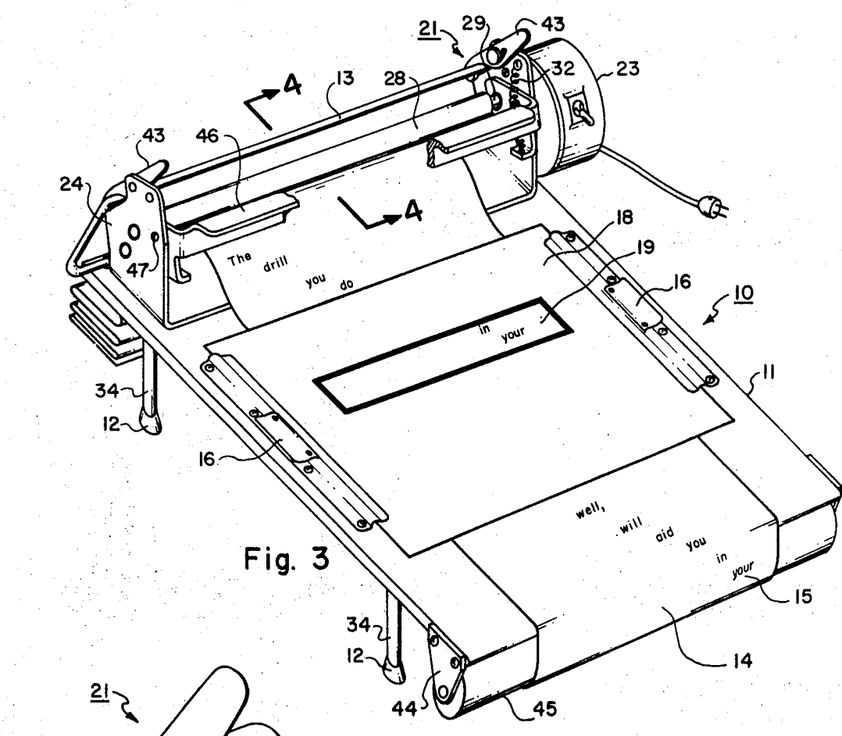
FIG. 3 is a perspective view of another embodiment of the invention.
Figure 4:
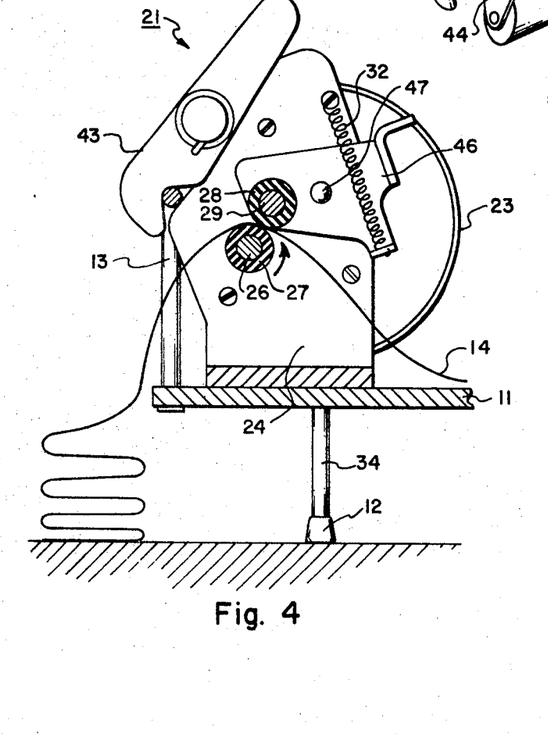
FIG. 4 is an enlarged sectional view of the drive mechanism taken along line 4—4 in FIG. 3.

A second embodiment of this invention, illustrated in FIGS. 3 and 4, includes a support element 10 and a drive mechanism 21. Support element 10 consists of copy support surface 11 which is held in an elevated position by legs 34 to the bottom of which rubber feet 12 are secured. Drive mechanism support 13 is mounted laterally across the upper end of surface 11. A supply roller 45, on which copy sheet 14 is wound, is rotatably mounted on the lower end of surface 11 by means of brackets 44. Supply roller 45 may be removable and replaceable and bracket 44 may be equipped with a rewind knob (similar to those used on cameras) for rewinding the copy sheet after a drill is completed.

Copy sheet 14 in this embodiment is a long, continuous sheet which is initially wound on supply roller 45. In this embodiment the type symbols 15 are arranged in at least two short horizontal groups or rows of not more than twenty symbols each. This alternate arrangement of symbols is used where it is desirable to keep the typist's eyes moving in a horizontal plane during the drill. The number of symbols in each row has been limited due to the fact that the maximum number of symbols the typist should concentrate on at any one time is usually not greater than twenty. The groups or rows are arranged in at least one angular line which slants from left to right across the copy sheet. The vertical spacing between these groups or rows is usually proportional to the number of symbols in each row. Thus, if the first row contains three symbols, the vertical distance between the first row and the second row would be the equivalent of three spaces. If the second row contained seven symbols, the vertical distance between it and the third row would be the equivalent of seven spaces. Vertical spacing, however, need not be measured in an equal number of ordinary typewriter spacing units, but may be measured in fractions or multiples of such units depending on the desired typing speed. With this arrangement of type symbols on the copy sheet, the typist reads the groups of symbols as they would ordinarily appear and is given an amount of time proportional to the number of symbols to type those symbols before the next group of symbols is revealed. The group of symbols may, however, be spaced equi-distant vertically regardless of the number of symbols in each group, especially if certain groups are easier, and therefore faster, to type.

Copy sheet 14 feeds from supply roller 45 and positioned overlying surface 11. Masking sheet 18, which is formed with an elongated opening or window, is positioned as overlying copy sheet 14 on the surface 11 and is secured to surface 11 by clips 16 in such a manner that copy sheet 14 may freely slide between the masking sheet and surface 11.

Drive mechanism 21 is mounted on support element 10 and secured to support 13 by spring clips 43. Drive mechanism 21 includes a constant speed electric motor 23 which is mounted outwardly of one of the vertically extending arms of frame 24 by means of support rods (not shown). Drive shaft 26 spans the arms of frame 24 and is journaled therein. Drive roller 27 is secured to the portion of drive shaft 26 between the arms of frame 24.

Tension roller 28 is secured on idler shaft 29 which is journaled in the ends of the outwardly extending arms of generally U-shaped over-center bracket 46. The over-center bracket 46 is pivotally mounted at points 47 to the arms of frame 24 with the horizontal middle portion of bracket 46 extending transversely across the front of drive mechanism 21 and with tension roller 28 positioned generally above drive roller 27. By pushing downwardly on bracket 46 tension roller 28 will move through an arc upwardly and away from drive roller 27. Springs 32 (only one of which is shown) maintain tension between the drive roller and the tension roller.

The combination of brackets 46, springs 32, and frame 24 forms an over-center linkage. With this linkage, as bracket 46 is pivoted about point 47 to move tension roller 28 away from drive roller 27, springs 32 move radially about the point where they are secured to frame 24 until the mid-portion of the springs passes over point 47 to the opposite side of point 47. When springs 32 are positioned on the opposite side of pivot point 47, the force they exert tends to hold or lock bracket 46 in the disengaged position. When it is again desired to engage the rollers, the typist need only push bracket 46 upward until springs 32 pass back across point 47 thereby reorienting the force of springs 32 to bring the rollers into frictional engagement.

In operation, the leading portion of copy sheet 14 is unwound from supply roller 45 and passed over surface 11. Masking sheet 18 is positioned overlying copy sheet 14 and secured to surface 11 in a manner which allows the copy sheet to slide thereunder. Bracket 46 is depressed until it locks in the over-center disengaged position. Copy sheet 14 is fed between the drive roller and the tension roller and is frictionally engaged therebetween by lifting bracket 46. When the motor 23 is turned on, copy sheet 14 feeds off the supply roller and under the masking sheet to successively reveal the symbols printed thereon. As the copy sheet passes through the drive mechanism, it falls over the upper end of the support element where it piles up in a Z-fold pattern. After the entire copy sheet has passed through the device, it is rewound on the supply roller for subsequent use.

This embodiment may utilize a copy sheet which is prefolded in a Z-fold pattern instead of a supply roller. Another alternative configuration would employ a take-up roller as well as a supply roller. The take-up roller could be spring actuated or frictionally or directly driven by the drive mechanism. Still another configuration of this embodiment would employ a copy sheet in the form of a continuous endless belt disposed longitudinally around support element 10. The endless belt copy sheet would provide continued repetition of a typing drill for an unlimited period of time.

Figure 5:
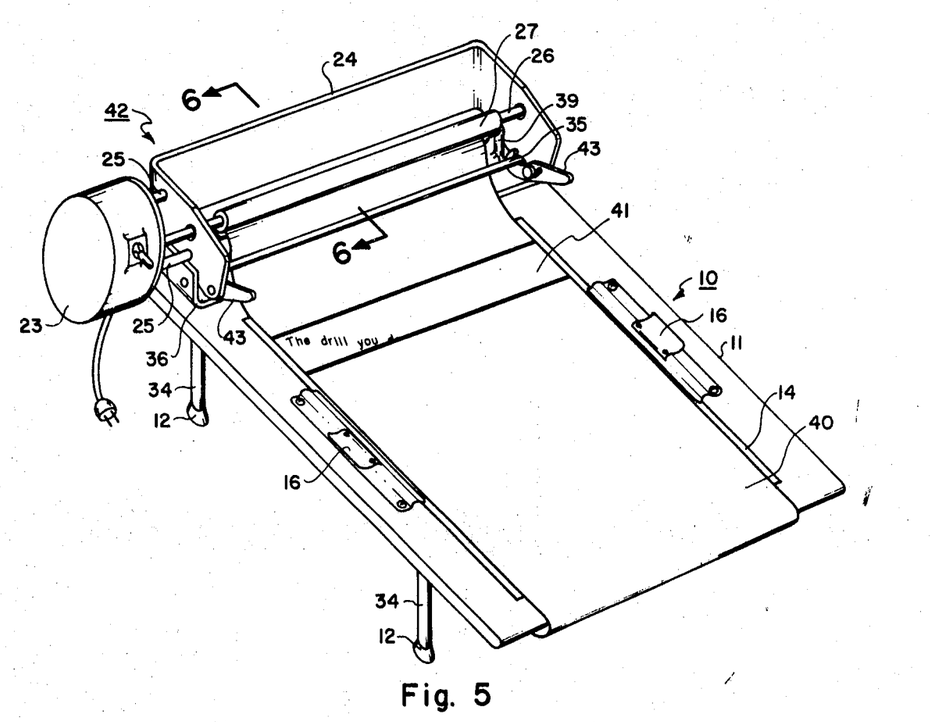
FIG. 5 is a perspective view of still another embodiment of the invention.
Figure 6:
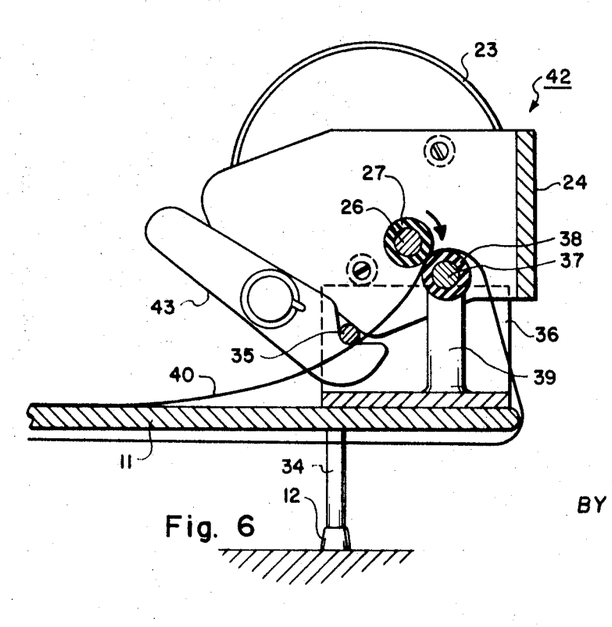
FIG. 6 is an enlarged sectional view of the drive mechanism taken along line 6—6 in FIG. 5.

Another embodiment of this invention, illustrated by FIGS. 5 and 6, includes a support element 10 and a drive mechanism 42. Support element 10 consists of copy support surface 11 which is held in an elevated position by legs 34 to the bottom of which rubber feet 12 are secured. Drive mechanism support 35 is positioned laterally across the upper end of surface 11 and is mounted in the upwardly extending arms of a generally U-shaped bracket 36. Shaft 37, on which idler roller 38 is secured, is journaled in the upper end of upwardly extending posts 39 (only one of which is shown). Posts 39 are mounted on the horizontal portion of bracket 36 near the ends thereof, allowing space for a portion of the arms of bracket 24 to extend between the posts and the arms of the bracket 36.

Copy sheet 14 on which type symbols 15 are arranged in at least one angular line slanting from left to right is secured to support element 10 by clips 16. Flexible masking sheet 40 which is in the form of an endless belt is positioned as overlying copy sheet 14 and extends around the lower edge of surface 11, between legs 34 and under support element 10, around the upper edge of surface 11 and over idler roller 38. Masking sheet 40 is formed with several transparent windows 41 (only one shown) positioned at intervals along its length, such intervals being approximately equal to the length of the copy sheet.

Drive mechanism 42 is positioned at the upper end of support element 10 and is pivotally mounted on drive mechanism support rod 35 by spring clips 43. Drive mechanism 42 includes a constant speed electric motor 23 which is mounted outwardly of one of the horizontally extending arms of frame 24 by means of support rods 25. The drive shaft 26 of electric motor 23 extends horizontally through the arms of frame 24 and is journaled therein. A drive roller 27 is secured on the portion of drive shaft 26 between the arms of frame 24. Drive mechanism 42 is brought into engagement with idler roller 38 by pivoting it about rod 35 until drive roller 27 comes into contact with, and rests on, idler roller 38. The weight of drive mechanism 42 provides sufficient force to frictionally drive masking sheet 40 between drive roller 27 and idler roller 38.

In operation, masking sheet 40 is moved downwardly over copy sheet 14 causing type symbols 15 to successively appear, from left to right, through the transparent window 41 of the masking sheet. When the transparent window 41 completes its movement over copy sheet 14, a second transparent window of the endless belt masking sheet comes into position at the top of the copy sheet and subsequently moves over the copy sheet in the same manner as the first window. Thus, the typist may continuously repeat a drill printed on the copy sheet for an unlimited period of time without stopping to reset the pacesetting device. Since purposeful repetition is a fundamental law of skill building. this embodiment can be extremely effective in developing a proper typing technique.

Figure 7:
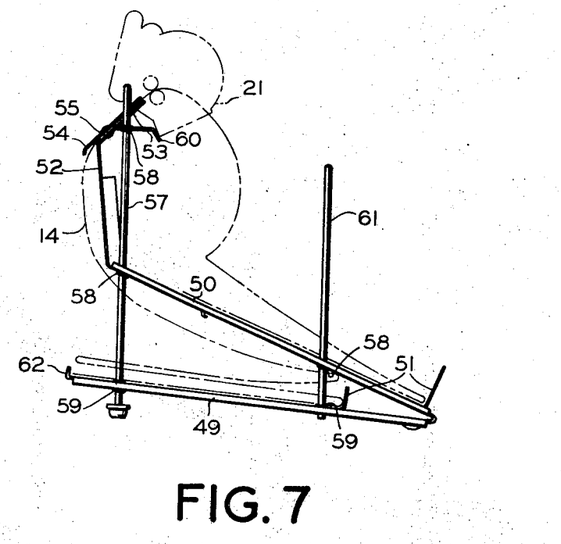
FIG. 7 is a perspective view of an embodiment of the invention in which the masking member is placed in an elevated angular position immediately in front of the typist.
Figure 8:
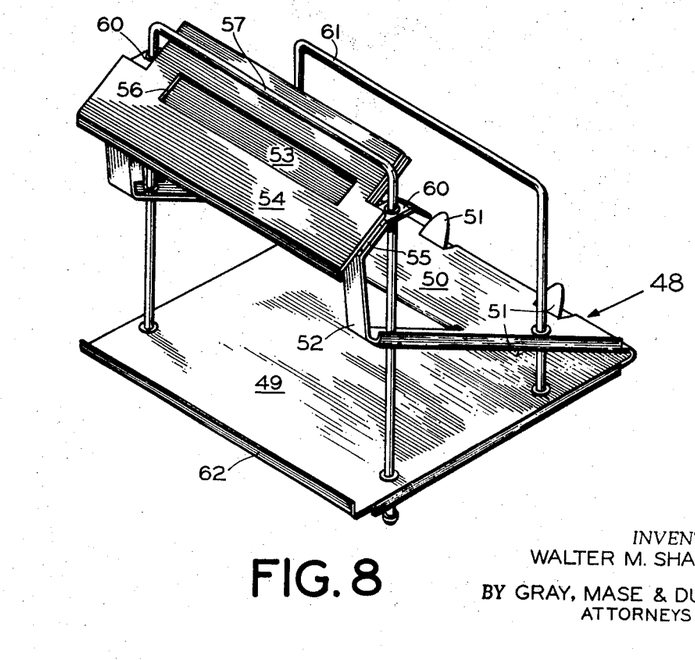
FIG. 8 is a side view of the device shown in FIG. 7.

Still another embodiment of this invention is illustrated by FIGS. 7 and 8. This embodiment includes a body member 48 which may be formed from a single sheet of material such as aluminum by any of the commonly known forming techniques. The body member 48 consists of a lower tray 49 where the Z-folded copy sheet 14 (shown in dashed lines in FIG. 7) is initially retained and an upper tray 50 located directly above the lower tray for collecting the copy sheet after feeding. The upper tray 50 is preferably inclined upwardly from the rear of the lower tray at an angle of 30 degrees to facilitate stacking of the copy sheet after feeding. The angle of inclination may be any convenient angle or the upper tray may even be positioned parallel to the lower tray. Retaining tabs 51 are provided near the rear of trays 49 and 50 to position the copy sheet and prevent disorientation and overflow thereof. The forward edge 62 of the lower tray 49 is formed upwardly to retain the copy sheet therein.

The body member 48 is also formed with a copy sheet support portion 52 which extends upwardly from the forward end of the upper tray 50. The upper portion of the support portion 52 is bent rearwardly, preferably at an angle of 45 degrees with the horizontal, to provide a planar surface 53 over which the copy sheet 14 is moved during operation of the device. The typist transcribes from the copy sheet as it passes over the planar surface 53 and the construction of this embodiment with the planar surface located in an elevated angular position at the front of the device serves to position the material to be transcribed directly in front of the typist with consequent ease in viewing.

A central opening is formed in the forward end of the upper tray 50 and said opening continues into the lower end of the support portion 52. This opening extends substantially across the entire width of the tray and is provided to allow the typist to conveniently remove the folded copy sheet from the upper tray after a drill by simply reaching through the device. Several of the edges of this opening are rolled or folded over to prevent snagging and consequent tearing of the copy sheet.

A masking member 54 is positioned overlying the planar surface 53 and is closely spaced therefrom by spacers 55. A portion of the masking member 54 overhangs the front of the support portion 52 and serves to guide the moving copy sheet 14 into the narrow space between the masking member and the planar surface. A lateral elongated opening or window 56 is formed in the masking member 54 above the planar surface 53 and performs the same function as the elongated openings disclosed in conjunction with previously described embodiments.

A small diameter, generally U-shaped support rod 57 is provided on which the drive mechanism 21 (shown in dashed lines in FIG. 7) is mounted as disclosed in connection with previously described embodiments. The arms of the support rod 57 extend vertically downward through tabs 60 (to be described later) formed from the support portion 52, and through the upper tray 50 and the lower tray 49 of the body member 48 at opposite sides and near the front thereof. The support rod 57 is secured to the body member 48 at the various intersecting points by rubber grommets 58 and washer-type fasteners 59. The central portion of the support rod 57 passes over the masking member 54 and can also serve as a handle for carrying the device. Support tabs 60 are formed downwardly at either side of the planar surface 53 and serve to support the drive mechanism 21 as shown in FIG. 7.

A U-shaped paper control hoop 61 is provided near the rear of the device to guide and to prevent improper folding of the copy sheet 14 during stacking in upper tray 50. The control hoop 61 is positioned parallel to the support rod 57 and its arms extend vertically downward through upper tray 50 and lower tray 49 on opposing sides and are similarly secured with rubber grommets 58 and washer-type fasteners 59. The exact position of the control hoop 61 is determined by the type of copy sheet and the distance between folds.

In this embodiment the copy sheet 14 is preferably a Z-fold paper of the type commonly employed in computer print-out operations. The folds may be merely creases or may also be perforated. In the preferred embodiment the folds are spaced at a distance approximately equal to the width of the copy sheet.

Referring to FIG. 7, the typist in using the device first places the Z-folded copy sheet 14 in the lower tray of the body member 48. The leading portion of the copy sheet is fed upwardly and through the narrow opening between the masking member 54 and the planar surface 53 and then between the engaging rollers of the drive mechanism 21. When the drive mechanism 21 is turned on the copy sheet 14 is driven over the planar surface 53 such that the type symbols appearing thereon successively become visible through the opening 56. Thus, the material to be transcribed is revealed to the typist in substantially the same manner as disclosed in connection with previously described embodiments. After passing through the drive mechanism 21, the copy sheet 14 descends by gravity to the upper tray 50 where it naturally settles in the Z-fold configuration. The control hoop 61 guides the copy sheet as it settles in the upper tray and assists in folding of the paper at the proper time.

Figure 9:
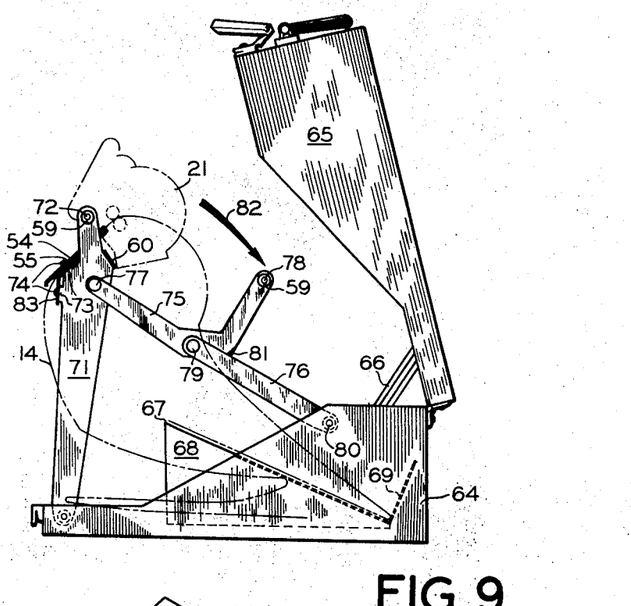
FIG. 9 is a perspective view of an embodiment of the invention which is adapted to fold into a carrying case.
Figure 10:
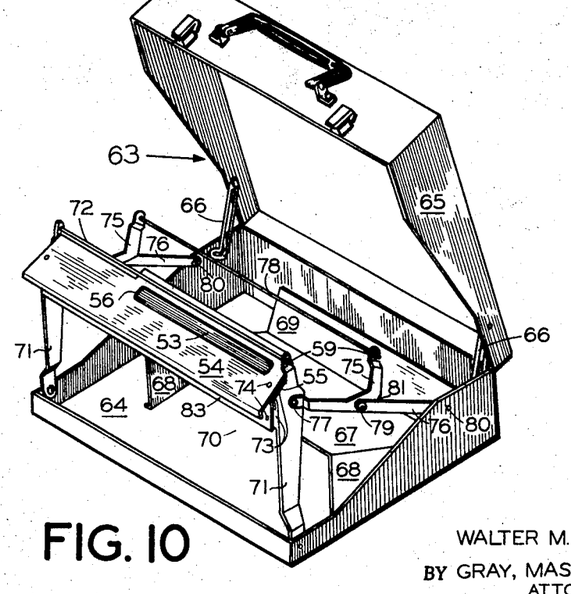
FIG. 10 is a side view of the device shown in FIG. 9.

FIGS. 9 and 10 show an embodiment of the invention which is adapted to fold into a carrying case for easy transportation. The carrying case 63 is of the type commonly used to transport typewriters and the like and includes a base portion 64, a cover 65, and notched guides 66 for locking the cover in the open position as shown. The cover 65 may be held in the open position by any of a number of well-known latching devices in lieu of the notched guides, or the cover may be detachable from the base portion of the case. In the preferred embodiment the central portion of the sidewall interfaces at which the cover 65 and the base portion 64 come together are formed on a bias downward toward the front of the case as shown. This provides easy access to the interior of the base portion 64.

An inclined shelf 67 is provided within the base portion of the case 63 for stacking of the Z-folded copy sheet 14 (shown in dashed lines in FIG. 9) after travel of the copy sheet through the device. The shelf 67 is preferably constructed of a thin sheet of aluminum or the like and is inclined upwardly toward the front of the base portion 64, preferably at an angle of 30 degrees. The side portions 68 of the shelf 67 are formed perpendicularly downward to provide its support and are spaced from the sidewalls of the base portion 64 to allow for folding of the brace and support members to be described later. To maintain proper alignment of the Z-fold copy sheet during stacking, a retaining lip 69 is formed upwardly and perpendicular to the shelf 67 at the rear thereof.

The shelf 67 is constructed such that a compartment 70 is provided thereunder. The compartment 70 is defined by the shelf 67, the side portions 68, and the section of the base portion 64 which is directly below the shelf 67. The Z-folded copy sheet 14 is placed in this compartment as shown in FIG. 10 prior to travel through the device. It will be apparent that the compartment 70 and the shelf 67 of this embodiment are utilized for the same purpose as the lower tray 49 and the upper tray 50, respectively, described in connection with the preceding embodiment, i.e., the copy sheet 14 feeds from the compartment 70 through the device and subsequently settles by gravity in a Z-fold pattern on the shelf 67. The compartment 70 also serves as a protective storage area for copy sheets during transportation.

Vertical support members 71 are pivotally mounted at their lower ends near the front and on opposing sidewalls of the base portion 64. Support members 71 are preferably formed from thin sheets of a rigid material such as aluminum. Drive mechanism support bar 72 extends horizontally through the upper ends of the support members 71 and is secured in place with washer-type fasteners 59. In operation, the drive mechanism 21

(shown in dashed lines in FIG. 9) is mounted on the bar 72 in the manner disclosed in connection with previously described embodiments.

A smooth plate 83 having a planar surface 53 is positioned between the upper ends of support members 71 below the bar 72. Tabs 73 are formed inwardly from the forward edge of support members 71 near the upper end thereof to provide support for the plate 83. The planar surface 53 is preferably positioned at an angle of 45 degrees with the horizontal as described in the preceding embodiment. The lower portion of the plate 83 is bent vertically downward to facilitate the passage of the copy sheet thereover. The sheet 83 is secured to the tabs 73 by rivets 74 or the like.

A masking member 54 is positioned overlying the planar surface 53, is closely spaced therefrom by spacers 55, and is secured by rivets 74. A portion of the masking member 54 overhangs in front of the planar surface 53 and serves to guide the copy sheet 14 as described in the preceding embodiment. A lateral elongated opening or window 56 is formed in the masking member 54 also as described in the preceding embodiment. Support tabs 60 are formed inwardly from the rear edge of support members 71 near the upper end thereof to support the drive mechanism 21 as shown in FIG. 9.

Generally L-shaped braces 75 and brace links 76 combine to form the linkage by which the device is folded into the carrying case 63. A description of the linkage on one side of the device will suffice for both. The free end of the long arm of the generally L-shaped brace 75 is pivotally mounted at point 77 in the upper end of the support member 71 just below the support tab 60. The brace 75 is positioned extending downward at a predetermined angle toward the rear of the base portion 64 with the short arm of the L-shaped brace extending upwardly. One end of the brace link 76 is pivotally connected to the long arm of the brace 75 at point 79 a slight distance above the short arm. The opposite end of the link 76 is pivotally secured in the sidewall of the base portion 64 at point 80 near the rear of the case. A small section of the lower edge of the short arm of the L-shaped brace 75 is formed outwardly to provide a stop 81. The stop 81 engages the upper edge of the brace link 76 when the link 76 and the long arm of the brace 75 are aligned on the same axis and prevents downward movement of those members. This provides a rigid brace between the support member 71 and the base portion 64. Various angular bends are formed in the support members 71 and the L-shaped braces 75 to allow clearance between the structural components during folding into the carrying case.

A paper stop bar 78 extends horizontally through the upper ends of the short arms of the L-shaped braces 75 and is secured in place by washer-type fasteners 59. The stop bar 78 performs the same function as the paper control hoop of the preceding embodiment.

FIGS. 9 and 10 show the device in the open position, ready for use by the typist. In operation, the typist first places the Z-folded copy sheet 14 in the compartment 70 and feeds the leading portion of the sheet upwardly through the narrow passage between the masking member 54 and the planar surface 53 and then between the engaging rollers of the drive mechanism 21. When the drive mechanism is turned on, the copy sheet 14 is driven upwardly over the planar surface 53 to reveal the type symbols printed thereon through the opening 56 of the masking member 54. After passing through the drive mechanism, the copy sheet descends by gravity to the shelf 67 where it naturally settles in the Z-fold configuration.

When the typist has concluded a practice session, the copy sheets are placed in the compartment 70 and the assembly is folded into the carrying case for storage. The particular embodiment illustrated is constructed such that the drive mechanism 21 may remain in the position shown in FIG. 9 during folding. The greater spacing between the left side portion 68 and the left sidewall of the base portion 64 is necessary to accommodate the motor of the drive mechanism 21 when the device is folded in this manner.

Referring to FIG. 10, to fold the device into the case 63 the typist pulls upwardly on the stop bar 78 which causes the support members 71 to travel downward in an arc about the pivot points at their lower ends as shown by arrow 82. As the members 71 travel downward, the L-shaped braces 75 and the brace links 76 swing upwardly about pivot points 77 and 80, respectively, until the long arms of the braces 75 are coaxial with the support members 71. At this point the typist pulls forward and downwardly on the stop bar 78 to cause the braces 75 to pass over to the opposite side of the support members 71 where they cooperate with the links 76 to exert a force on the support members 71 to continue their downward motion. When the braces 75 pass over to the opposite side of the support members 71, the links 76 discontinue their upward swing and begin to swing downwardly in the same direction as the braces 75. The downward pulling on the stop bar 78 is continued until the stop bar comes to rest on the forward edges of the support members 71. At this point the linkage assemblies consisting of the support members 71, the L-shaped braces 75 and the brace links 76 are completely folded into the spaces between the side members 68 and the sidewalls of the base portion 74 and the drive mechanism 21 is resting in the angular recess at the rear of the shelf 67 allowing the cover 65 of the case 63 to be closed.

It will be apparent that folding apparatus illustrated in FIGS. 9 and 10 allows the use of a narrow carrying case having a height substantially less than that of the ready-to-use device. This provides a space-saving advantage when storing the apparatus, especially where many units are employed as in a school classroom. The folding linkage described is only illustrative as there are other linkages which are equally applicable for the same purpose.

The drive mechanism used with any of the disclosed embodiments can utilize a variable speed electric motor in place of a constant speed motor in which case only one copy sheet with a predetermined angular arrangement of symbols is necessary.

It will be noted that the disclosed copy sheet symbol arrangements, masking sheet configurations, and drive mechanism designs may, where possible, be interchangeably used in the various embodiments herein disclosed without departing from the scope of the invention.

It will be understood, of course, that while the forms of the invention herein shown and described constitute preferred embodiments of the invention, it is not intended to illustrate all possible forms of the invention. It will also be understood that the words used are words of description rather than of limitation and that various changes may be made without departing from the spirit and scope of the invention herein disclosed.

I claim:

1. A pacesetting apparatus for use as an aid in teaching and improving typing skills comprising:
   (a) a copy sheet with type symbols appearing thereon in at least one angular line which slants at an inclined angle from left to right, said symbols in said angular line comprising a drill to be transcribed;
   (b) a flat surface with means for securing said copy sheet thereto;
   (c) a masking member formed with a transverse elongated opening, said masking member overlying said copy sheet and being disposed to expose through said opening a limited number of successive symbols in one said angular line and further disposed to mask out at least those symbols immediately surrounding the exposed symbols; and
   (d) drive means disposed to frictionally engage said masking member and drive said masking member downwardly over said copy sheet at a constant predetermined rate to successively reveal the symbols in said angular line through said opening for a preselected period of time during which they are read for transcription.

2. The apparatus of claim 1 wherein said masking member is in the form of an endless belt, said belt being disposed to continuously pass over said copy sheet and around said flat surface, said copy sheet being secured to said flat surface.

3. The apparatus of claim 1 wherein said type symbols appearing in said angular line are arranged in at least two short horizontal rows of not more than twenty symbols each.

4. The apparatus of claim 3 wherein the vertical spacing between any two of said horizontally disposed short rows of symbols in said angular line is proportional to the number of type symbols in the first of those two rows.

5. A pacesetting apparatus for use as an aid in teaching and improving typing skills comprising:
 (a) a copy sheet with type symbols appearing thereon in at least one angular line which slants at an inclined angle from left to right, said symbols in said angular line being arranged in at least two short horizontal rows of not more than twenty symbols each;
 (b) a flat surface with means for securing said copy sheet thereto;
 (c) an endless belt masking member formed with at least one transverse, elongated transparent window, said masking member overlying said copy sheet and being disposed to continuously pass over said copy sheet and longitudinally around said flat surface and further disposed to expose through said window a limited number of successive symbols in one said angular line;
 (d) drive means disposed to frictionally engage said masking member and drive said masking member downwardly over said copy sheet and around said flat surface at a constant predetermined rate to successively reveal the symbols in said angular line through said transparent window for a preselected period of time during which they are read for transcription.

6. A pacesetting apparatus for use as an aid in teaching and improving typing skills comprising:
 (a) a copy sheet with type symbols appearing thereon in at least one angular line which slants at an inclined angle from left to right;
 (b) a flat surface supporting at least a portion of said copy sheet;
 (c) a masking member formed with a transverse elongated opening, said masking member overlying said copy sheet and said flat surface and being disposed to expose through said opening a limited number of successive symbols in one said angular line and further disposed to mask out at least those symbols immediately surrounding the exposed symbols, said masking member being secured to said flat surface to allow said copy sheet to slide longitudinally therebetween; and
 (d) drive means disposed to frictionally engage said copy sheet and drive said copy sheet upwardly between said masking member and said flat surface at a constant predetermined rate to successively reveal the symbols in said angular line through said opening for a preselected period of time during which they are read for transcription.

7. The apparatus of claim 6 wherein said copy sheet is in the form of a continuous, endless belt.

8. The apparatus of claim 6 wherein said copy sheet is Z-folded.

9. The apparatus of claim 6 wherein said type symbols appearing in said angular line are arranged in at least two short horizontal rows of not more than twenty symbols each.

10. The apparatus of claim 9 wherein the vertical spacing between any two of said horizontally disposed short rows of symbols in said angular line is proportional to the number of type symbols in the first of those two rows.

References Cited

UNITED STATES PATENTS

| 443,314 | 12/1890 | Brunthaver | 40—346 |
| 2,662,307 | 12/1953 | Simpson | 35—35(.2) |
| 3,030,923 | 4/1962 | Abseck et al. | 40—345X |
| 823,362 | 6/1906 | Powell et al. | 35—5X |
| 1,357,214 | 11/1920 | Betz | 283—47UX |
| 3,285,384 | 11/1966 | Sharp | 197—187 |

WILLIAM H. GRIEB, Primary Examiner

U.S. Cl. X.R.

40—345